US012597354B2

(12) United States Patent
Lewis et al.

(10) Patent No.: US 12,597,354 B2
(45) Date of Patent: Apr. 7, 2026

(54) SYSTEMS AND METHODS FOR IDENTIFYING A VEHICLE ASSET PAIRING

(71) Applicant: Geotab Inc., Oakville (CA)

(72) Inventors: Daniel J. Lewis, Cambridge (CA); Robert Bradley, Oakville (CA); Prateek Srivastava, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/747,839

(22) Filed: Jun. 19, 2024

(65) Prior Publication Data

US 2024/0428688 A1 Dec. 26, 2024

Related U.S. Application Data

(60) Provisional application No. 63/522,752, filed on Jun. 23, 2023.

(51) Int. Cl.
*H04W 4/024* (2018.01)
*G08G 1/00* (2006.01)

(52) U.S. Cl.
CPC ............ *G08G 1/202* (2013.01); *G08G 1/207* (2013.01)

(58) Field of Classification Search
CPC ........ G08G 1/202; G08G 1/205; G08G 1/207; H04W 4/02; H04W 64/00; H04W 4/029; H04W 4/024; H04W 4/021; H04W 4/09
See application file for complete search history.

(56) References Cited

U.S. PATENT DOCUMENTS

| | | | |
|---|---|---|---|
| 6,429,810 | B1 | 8/2002 | De Roche |
| 10,173,486 | B1 | 1/2019 | Lee et al. |

(Continued)

FOREIGN PATENT DOCUMENTS

| | | | |
|---|---|---|---|
| EP | 3893526 | A1 | 10/2021 |
| EP | 3919860 | A1 | 12/2021 |
| WO | 2010042583 | A2 | 4/2010 |

OTHER PUBLICATIONS

Extended European Search Report for European Application No. 24183150.2, mailed Nov. 6, 2024, 11 pages.

(Continued)

*Primary Examiner* — Khawar Iqbal
(74) *Attorney, Agent, or Firm* — Gabriel F. Rogers

(57) ABSTRACT

The present disclosure relates to systems and methods for identifying vehicle asset pairings. For example, a method for identifying a vehicle asset pairing, the method comprising operating at least one processor to: receive telematics data comprising geospatial data associated with a plurality of vehicle assets; identify one or more positions of each of the plurality of vehicle assets reported within a selected time-frame; define a search zone based on a selected reported position of a selected vehicle asset; identify one or more candidate vehicle asset pairings, each candidate vehicle asset pairing being between the selected vehicle asset and a candidate vehicle asset having at least one reported position located within the search zone; identify, if the candidate vehicle asset has two or more reported positions within the search zone, a first reported position and a second reported position of the candidate vehicle asset; generate an interpolated position of the candidate vehicle asset based on the first reported position and the second reported position thereof that is most proximate the selected reported position, for each candidate vehicle asset pairing; and identify the vehicle asset pairing based at least in part on a distance of the interpolated position from the selected reported position, of each candidate vehicle asset pairing.

25 Claims, 6 Drawing Sheets

(56) References Cited

U.S. PATENT DOCUMENTS

| | | | | |
|---|---|---|---|---|
| 10,356,577 | B1 | 7/2019 | Kugler et al. | |
| 11,257,368 | B2 * | 2/2022 | Shin | H04W 4/46 |
| 11,335,191 | B2 | 5/2022 | Lewis et al. | |
| 11,526,835 | B2 | 12/2022 | Cawse et al. | |
| 11,861,955 | B1 * | 1/2024 | Dubin | G07C 5/10 |
| 12,062,027 | B2 * | 8/2024 | Cain, Jr. | G06F 16/2379 |
| 2019/0286793 | A1 * | 9/2019 | Patton | H04W 4/44 |
| 2020/0084193 | A1 * | 3/2020 | Beaurepaire | G05D 1/0287 |
| 2020/0320863 | A1 * | 10/2020 | Lewis | G08G 1/0125 |
| 2021/0011489 | A1 * | 1/2021 | Patton | H04W 4/021 |
| 2021/0090018 | A1 * | 3/2021 | Uçar | G06Q 10/0832 |
| 2021/0279974 | A1 * | 9/2021 | Crawley | G06Q 10/087 |
| 2021/0312726 | A1 * | 10/2021 | Schäfer | H04W 4/23 |
| 2021/0326807 | A1 * | 10/2021 | Howell | G06Q 10/08 |
| 2024/0015265 | A1 * | 1/2024 | Ballantyne | G06V 20/56 |
| 2024/0053156 | A1 * | 2/2024 | Jeschke | G01C 21/3492 |
| 2024/0271948 | A1 * | 8/2024 | Gupta | G06N 3/08 |

OTHER PUBLICATIONS

Wikipedia Quadtree: "Quadtree—Wikipedia", Oct. 15, 2021 (Oct. 15, 2021), XP093217339, Retrieved from the Internet: URL:https://en.wikipedia.org/w/index.php?t itle=Quadtree&oldid=1050058976 * p. 1 * * p. 3 *.

* cited by examiner

SYSTEMS AND METHODS FOR IDENTIFYING A VEHICLE ASSET PAIRING

CROSS-REFERENCE TO RELATED APPLICATIONS

This application claims priority to and the benefit of U.S. Patent Application Ser. No. 63/522,752, filed on Jun. 23, 2023, which is hereby incorporated by reference in its entirety.

TECHNICAL FIELD

The present disclosure generally relates to vehicle asset tracking. More particularly, the present disclosure relates to the identification of vehicle asset pairings.

BACKGROUND

Fleet management generally involves managing various aspects of a vehicle fleet by, for example, tracking vehicle assets, optimizing routes, maintaining vehicle asset operability, etc. For many industries, an important aspect of fleet management is the tracking of vehicle asset pairings (e.g., a trailer coupled to a vehicle). For example, it is often useful to identify available unpowered and powered vehicle assets, identify when vehicle assets are coupled, track the location of vehicle asset pairing, monitor the status of vehicle asset pairing, etc.

Conventional techniques for identifying vehicle asset pairings often require a system (e.g., a fleet management system) to receive an indication that one vehicle asset (e.g., an unpowered vehicle asset such as a trailer) is paired, or coupled, to another (e.g., a powered vehicle such as a motor vehicle). The indication of a vehicle asset pairing may be manually sent to the system by, for example, a vehicle operator, or by a proprietary system configured to send such an indication upon the coupling of the vehicle assets.

However, such conventional techniques have a number of drawbacks. For example, such techniques may require a vehicle operator to be present for the pairing to send an indication to the system. Further, as will be appreciated, such proprietary systems may be expensive or impractical to implement (e.g., the cost and difficulty associated with installing proprietary systems on every vehicle asset may be substantial). Furthermore, such conventional techniques may not be capable of identifying vehicle asset pairings when the vehicle assets are in motion (e.g., completing a trip). In more detail, if a vehicle operator or proprietary system fails to send an indication to a system that the vehicle assets are paired at the time of pairing, a fleet manager may be unable to determine whether the vehicle assets are paired, whether the correct vehicle assets are paired, etc.

Thus, a need exists for improved systems and methods for identifying vehicle asset pairings.

SUMMARY

In one aspect, the present disclosure relates to a system for identifying a vehicle asset pairing, the system comprising: at least one data storage operable to store telematics data, the telematics data comprising geospatial data associated with a plurality of vehicle assets; and at least one processor in communication with the at least one data storage, the at least one processor operable to: receive the geospatial data associated with the plurality of vehicle assets; identify, using the geospatial data, one or more positions of each of the plurality of vehicle assets reported within a selected timeframe; define a search zone based on a selected reported position of a selected vehicle asset; identify one or more candidate vehicle asset pairings, each candidate vehicle asset pairing being between the selected vehicle asset and a candidate vehicle asset having at least one reported position located within the search zone; identify, if the candidate vehicle asset has two or more reported positions within the search zone, a first reported position and a second reported position of the candidate vehicle asset; generate an interpolated position of the candidate vehicle asset based on the first reported position and the second reported position thereof that is most proximate the selected reported position of the selected vehicle asset for each candidate vehicle asset pairing; and identify the vehicle asset pairing based at least in part on a distance of the interpolated position of the candidate vehicle asset from the selected reported position of the selected vehicle asset of each candidate vehicle asset pairing.

According to an embodiment, the at least one processor is operable to define the search zone by: identifying, based on a hierarchical geospatial indexing system, a first cell corresponding to a geographical area within which the selected reported position of the selected vehicle asset is located; determining a plurality of neighboring cells based on the first cell; and defining the search zone based on a geographical area corresponding to the first cell and the neighboring cells.

According to a further embodiment, the hierarchical geospatial indexing system is a geohash system.

According to an embodiment, the at least one processor is further operable to identify the one or more candidate vehicle asset pairings based at least in part on a difference between a reporting time of the selected reported position of the selected vehicle asset and a reporting time of each of the at least one reported positions of the candidate vehicle asset.

According to an embodiment, the at least one processor is further operable to identify the one or more candidate vehicle asset pairings based at least in part on a difference in speed between the selected vehicle asset at the selected reported position and the candidate vehicle asset at each of the at least one reported positions of the candidate vehicle asset.

According to an embodiment, one of the first reported position and the second reported position of the candidate vehicle asset occur prior to the selected reported position of the selected vehicle asset, and the other of the first reported position and the second reported position of the candidate vehicle asset occur after to the selected reported position of the selected vehicle asset.

According to a further embodiment, the at least one processor is operable to generate the interpolated position between the first reported position and the second reported position of the candidate vehicle asset for each candidate vehicle asset pairing.

According to a further embodiment, the at least one processor is operable to generate the interpolated position along a line extending between the first reported position and the second reported position of the candidate vehicle asset for each candidate vehicle asset pairing.

According to an embodiment, if the candidate vehicle asset has only one reported position located within the search zone, the at least one processor is operable to generate the interpolated position thereof based on that reported position.

According to an embodiment, if both of the first reported position and the second reported position of the candidate vehicle asset occur prior to, or after, the selected reported position of the selected vehicle asset, the at least one processor is operable to generate the interpolated position thereof based on a most proximate of the first reported position and the second reported position relative to the selected reported position.

According to an embodiment, the interpolated position is an estimated position of the candidate vehicle asset at a time of reporting of the selected reported position of the selected vehicle asset.

According to an embodiment: the selected vehicle asset at the selected reported position has associated therewith a selected vehicle asset speed; each candidate vehicle asset at the first reported position has associated therewith a first vehicle asset speed; each candidate vehicle asset at the second reported position has associated therewith a second vehicle asset speed; and each candidate vehicle asset at the interpolated position thereof has associated therewith an interpolated vehicle asset speed based at least in part on the first vehicle asset speed and the second vehicle asset speed of the candidate vehicle asset.

According to a further embodiment, the at least one processor is operable to identify the vehicle asset pairing by: determining, for each candidate vehicle asset pairing: an asset distance difference based on the distance of the interpolated position of the candidate vehicle asset from the selected reported position of the selected vehicle asset; and an asset speed difference based on a difference between the interpolated vehicle asset speed of the candidate vehicle asset and the selected vehicle asset speed of the selected vehicle asset; and identifying the vehicle asset pairing based on the asset distance difference and the asset speed difference of each of the one or more candidate vehicle asset pairings.

According to a further embodiment, the at least one processor is further operable to identify the vehicle asset pairing by: ranking the one or more candidate vehicle asset pairings based on the asset distance difference and the asset speed difference associated with each thereof; and selecting one of the one or more candidate vehicle asset pairings as the vehicle asset pairing based on the ranking thereof.

According to an embodiment, the telematics data further comprises map data, and the at least one processor is further operable to identify the vehicle asset pairing by: identifying a first road segment having the selected reported position of the selected vehicle asset thereon; identifying, for each of the one or more candidate vehicle asset pairings, a second road segment having the interpolated position of the candidate vehicle asset thereon; and identifying the vehicle asset pairing based on whether the first road segment and the second road segment are a same type of road segment.

According to an embodiment, the at least one processor is further operable to determine a location, a time, or a combination thereof corresponding to when the vehicle asset pairing occurred and/or terminated.

According to a further embodiment, the at least one processor is operable to determine the location, the time, or the combination thereof corresponding to when the vehicle asset pairing occurred and/or terminated by propagating geospatial data associated with the vehicle asset pairing backwards or forwards temporally until the vehicle asset pairing is at rest; based on a speed difference between the vehicle assets of the vehicle asset pairing exceeds a predetermined threshold; based on the selected vehicle asset being paired with a different candidate vehicle asset; or a combination thereof.

According to an embodiment, the selected vehicle asset reports the telematics data at a first frequency and the candidate vehicle asset reports geospatial data associated therewith at a second frequency.

According to an embodiment, the first frequency is less than the second frequency.

According to an embodiment, the at least one processor is operable to perform one or more operations thereof upon the reporting of the geospatial data associated with the selected vehicle asset.

According to an embodiment, the selected vehicle asset is an unpowered vehicle asset and the candidate vehicle asset is a powered vehicle asset.

According to an embodiment, the at least one processor is operable to identify the vehicle asset pairing during a trip.

In another aspect, the present disclosure relates to a method for identifying a vehicle asset pairing, the method comprising operating at least one processor to: receive telematics data, the telematics data comprising geospatial data associated with the plurality of vehicle assets; identify, using the geospatial data, one or more positions of each of the plurality of vehicle assets reported within a selected timeframe; define a search zone based on a selected reported position of a selected vehicle asset; identify one or more candidate vehicle asset pairings, each candidate vehicle asset pairing being between the selected vehicle asset and a candidate vehicle asset having at least one reported position located within the search zone;

identify, if the candidate vehicle asset has two or more reported positions within the search zone, a first reported position and a second reported position of the candidate vehicle asset; generate an interpolated position of the candidate vehicle asset based on the first reported position and the second reported position thereof that is most proximate the selected reported position of the selected vehicle asset for each candidate vehicle asset pairing; and identify the vehicle asset pairing based at least in part on a distance of the interpolated position of the candidate vehicle asset from the selected reported position of the selected vehicle asset of each candidate vehicle asset pairing.

According to an embodiment, the defining of the search zone comprises operating the at least one processor to: identify, based on a hierarchical geospatial indexing system, a first cell corresponding to a geographical area within which the selected reported position of the selected vehicle asset is located; determine a plurality of neighboring cells based on the first cell; and define the search zone based on a geographical area corresponding to the first cell and the neighboring cells.

According to a further embodiment, the hierarchical geospatial indexing system is a geohash system.

According to an embodiment, the method further comprises operating the at least one processor to identify the one or more candidate vehicle asset pairings based at least in part on a difference between a reporting time of the selected reported position of the selected vehicle asset and a reporting time of each of the at least one reported positions of the candidate vehicle asset.

According to an embodiment, the method further comprises operating the at least one processor to identify the one or more candidate vehicle asset pairings based at least in part on a difference in speed between the selected vehicle asset at the selected reported position and the candidate vehicle asset at each of the at least one reported positions of the candidate vehicle asset.

According to an embodiment, one of the first reported position and the second reported position of the candidate vehicle asset occur prior to the selected reported position of the selected vehicle asset, and the other of the first reported position and the second reported position of the candidate vehicle asset occur after to the selected reported position of the selected vehicle asset.

According to an embodiment, the generating of the interpolated position comprises operating the at least one processor to generate the interpolated position between the first reported position and the second reported position of the candidate vehicle asset for each candidate vehicle asset pairing.

According to a further embodiment, the generating of the interpolated position comprises operating the at least one processor to generate the interpolated position along a line extending between the first reported position and the second reported position of the candidate vehicle asset for each candidate vehicle asset pairing.

According to an embodiment, if the candidate vehicle asset has only one reported position located within the search zone, the generating of the interpolated position comprises operating the at least one processor to generate the interpolated position thereof based on that reported position.

According to an embodiment, if both of the first reported position and the second reported position of the candidate vehicle asset occur prior to, or after, the selected reported position of the selected vehicle asset, the generating of the interpolated position comprises operating the at least one processor to generate the interpolated position thereof based on a most proximate of the first reported position and the second reported position relative to the selected reported position.

According to an embodiment, the interpolated position is an estimated position of the candidate vehicle asset at a time of reporting of the selected reported position of the selected vehicle asset.

According to an embodiment: the selected vehicle asset at the selected reported position has associated therewith a selected vehicle asset speed; each candidate vehicle asset at the first reported position has associated therewith a first vehicle asset speed; each candidate vehicle asset at the second reported position has associated therewith a second vehicle asset speed; and each candidate vehicle asset at the interpolated position thereof has associated therewith an interpolated vehicle asset speed based at least in part on the first vehicle asset speed and the second vehicle asset speed of the candidate vehicle asset.

According to a further embodiment, the identifying of the vehicle asset pairing comprises operating the at least one processor to: determine, for each candidate vehicle asset pairing: an asset distance difference based on the distance of the interpolated position of the candidate vehicle asset from the selected reported position of the selected vehicle asset; and an asset speed difference based on a difference between the interpolated vehicle asset speed of the candidate vehicle asset and the selected vehicle asset speed of the selected vehicle asset; and identify the vehicle asset pairing based on the asset distance difference and the asset speed difference of each of the one or more candidate vehicle asset pairings.

According to a further embodiment, the identifying of the vehicle asset pairing further comprises operating the at least one processor to: rank the one or more candidate vehicle asset pairings based on the asset distance difference and the asset speed difference associated with each thereof; and select one of the one or more candidate vehicle asset pairings as the vehicle asset pairing based on the ranking thereof.

According to an embodiment, the telematics data further comprises map data, and the identifying of the vehicle asset pairing further comprises operating the at least one processor to: identify a first road segment having the selected reported position of the selected vehicle asset thereon; identify, for each of the one or more candidate vehicle asset pairings, a second road segment having the interpolated position of the candidate vehicle asset thereon; and identify the vehicle asset pairing based on whether the first road segment and the second road segment are a same type of road segment.

According to an embodiment, the method further comprises operating the at least one processor to determine a location, a time, or a combination thereof corresponding to when the vehicle asset pairing occurred and/or terminated.

According to a further embodiment, the determining of the location, the time, or the combination thereof corresponding to when the vehicle asset pairing occurred and/or terminated comprises operating the at least one processor to: propagate geospatial data associated with the vehicle asset pairing backwards or forwards temporally until the vehicle asset pairing is at rest; determine whether a speed difference between the vehicle assets of the vehicle asset pairing exceeds a predetermined threshold; determine whether the selected vehicle asset is paired with a different candidate vehicle asset; or a combination thereof.

According to an embodiment, the selected vehicle asset reports the telematics data at a first frequency and the candidate vehicle asset reports geospatial data associated therewith at a second frequency.

According to a further embodiment, the first frequency is less than the second frequency.

According to an embodiment, the method comprises operating the at least one processor to perform one or more operations upon the reporting of the telematics data associated with the selected vehicle asset.

According to an embodiment, the selected vehicle asset is an unpowered vehicle asset and the candidate vehicle asset is a powered vehicle asset.

According to an embodiment, the method is for identifying the vehicle asset pairing during a trip.

In another aspect, the present disclosure relates to a non-transitory computer readable medium having instructions stored thereon executable by at least one processor to implement the methods described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
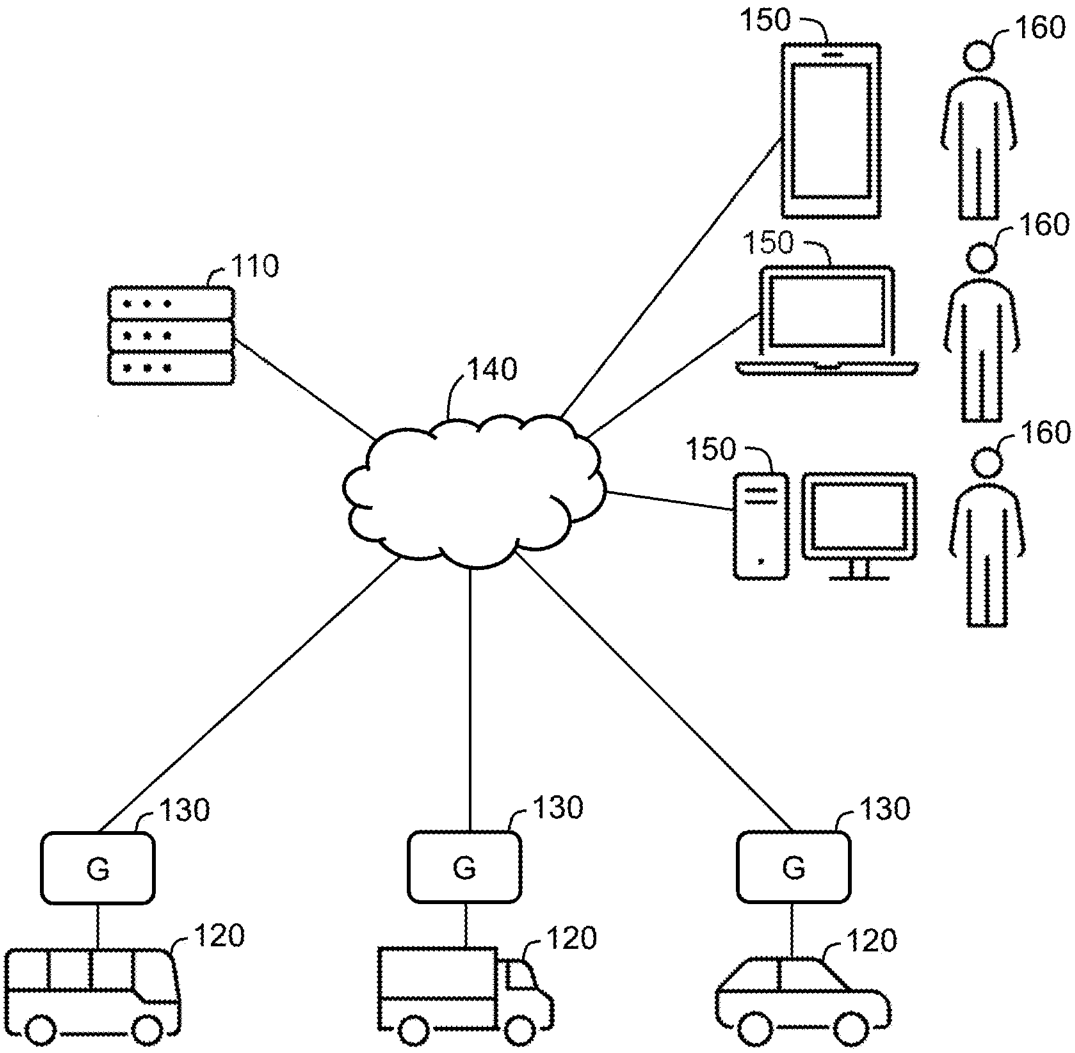
FIG. 1 is a block diagram of various components interacting with an example fleet management system according to an embodiment of the present disclosure.

Identification of vehicle asset pairings represents an important operational aspect for many industries. However, conventional techniques for identifying vehicle asset parings have a number of shortcomings. For example, as described herein, conventional techniques often require a system, such as a fleet management system, to receive an indication from a user (e.g., a vehicle operator) or a proprietary system that vehicle assets have been coupled, or paired. However, such techniques may require the vehicle operator (or another authorized user) to be present during the coupling of the vehicle assets, which, as will be appreciated, may not always be practicable (e.g., vehicle assets may be coupled prior to use by an operator). As well, proprietary systems configured for detecting and indicating that one vehicle asset is coupled to another may be impractical for users managing large vehicle fleets as such systems may require the installation of proprietary components on all vehicle assets, which may not only be difficult and time-consuming but may also have a substantial cost associated therewith.

Further, such conventional techniques may not be capable of, or well-suited for, identifying vehicle asset pairings during the completion of a trip (i.e., while the vehicle assets are in motion). In more detail, as described above, such conventional techniques generally require a vehicle operator or a proprietary system to indicate to, for example, a fleet management system that a vehicle asset pairing has occurred. However, in some cases, the vehicle operator or the proprietary system may fail to send an indication that the vehicle assets are paired (e.g., the vehicle operator is not present and/or forgets, the proprietary system loses connection to a network, etc.). In such cases, a fleet manager or fleet management system may be unable to determine whether the vehicle assets are paired, what vehicle assets are paired, whether the correct vehicle assets are paired, etc.

It is therefore an object of the present disclosure to provide advantageous systems and methods for identifying vehicle asset pairings. For example, in some embodiments, the systems and methods of the present disclosure may avoid the shortcomings of the conventional techniques described herein. In more detail, the systems and methods of the present disclosure may not require a user (e.g., a vehicle operator) or a proprietary system to indicate to a system (e.g., a fleet management system) that a vehicle asset pairing has occurred. Further, as will be described herein, the systems and methods of the present disclosure may be used to identify vehicle asset pairings during a trip (i.e., while the vehicle asset pairing is in motion).

Furthermore, the systems and methods of the present disclosure may be particularly efficient (e.g., with respect to processing requirements), such that they may be particularly scalable. In more detail, the systems and methods described herein may be capable of processing geospatial data associated with a substantial number of vehicle assets to identify vehicle asset pairings therefrom. For example, in some embodiments, the systems and methods of the present disclosure may use telematics data such as geospatial data associated with thousands of vehicle assets to identify vehicle asset pairings therefrom. As will be appreciated, such embodiments may be particularly useful for commercial users managing large vehicle fleets, including those in industries such as freight transport.

Further still, in some embodiments, the systems and methods of the present may not require the use of proprietary systems for the functionality thereof. In more detail, and as will be described herein, the systems and methods of the present disclosure may use telematics data comprising geospatial data associated with vehicle assets to identify vehicle asset pairings therefrom. The geospatial data may be provided by any suitable device and is not limited to, for example, a specific proprietary device or devices. Thus, a user may not be required to purchase and install proprietary devices, which, as will be appreciated, may significantly decrease the cost associated with the implementation of the methods and systems of the present disclosure.

As well, in some embodiments, the systems and methods described herein may be capable of using geospatial data reported at different frequencies to identify vehicle asset pairings. That is, geospatial data associated with different vehicle assets received at different times may still be used to identify vehicle asset pairings. As a result, vehicle assets equipped with, for example, different devices for reporting telematics data such as geospatial data may still be processed together by the systems and methods of the present disclosure to identify vehicle asset pairings therefrom. As will be appreciated, such embodiments may provide a user with flexibility with regards to how geospatial data is reported for use by the methods and systems of the present disclosure, which may, in turn, decrease the cost associated with their implementation.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Referring now to FIG. 1, there is shown an example of a fleet management system 110 for managing a plurality of vehicle assets 120 equipped with a plurality of telematics devices 130. Each of the telematics devices 130 is capable of collecting various data from the vehicle assets 120 (i.e., telematics data) and sharing the telematics data with the fleet management system 110. The fleet management system 110 may be remotely located from the telematics devices 130 and the vehicle assets 120.

It is noted that, while only three vehicle assets 120 having three telematics devices 130 are shown in the illustrated example, it will be appreciated that there may be any number of vehicle assets 120 and telematics devices 130. For example, the fleet management system 110 may manage hundreds, thousands, or even millions of vehicle assets 120 and telematics devices 130.

In the context of the present disclosure, the vehicle assets 120 may include any type of powered or unpowered vehicle assets. Examples of powered vehicle assets include, but are not limited to, cars, trucks (e.g., pickup trucks, heavy-duty trucks such as class-8 vehicles, etc.) motorcycles, industrial vehicles, recreational vehicles (e.g., all-terrain vehicles), and any other motorized vehicle assets. Each powered vehicle asset may independently be a gas, diesel, electric, hybrid, and/or alternative fuel vehicle asset. Further, the powered vehicle assets may include those such as railed vehicles (e.g., trains, trams, and streetcars), and other powered vehicles that may be coupled to other vehicle assets (e.g., unpowered vehicle assets). The unpowered vehicle assets may include vehicles that are not self-propellable—i.e., that require an external force to move (e.g., by a powered vehicle). Examples of unpowered vehicle assets include trailers (e.g., auto-haulers, bulk commodity trailers, freight trailers, livestock trailers, tank trailers, flatbed trailers, travel trailers, and the like), rail cars, and any other towable vehicle asset. Each of the vehicle assets 120 may be equipped with one of the telematics devices 130.

In some embodiments, the telematics devices 130 may be standalone devices that are removably installed in the vehicle assets 120 (e.g., aftermarket telematics devices). In other embodiments, the telematics devices 130 may be integrated components of the vehicle assets 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicle assets 120. For example, the telematics data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicle assets 120, such as, but not limited to, location information, trip distances and times, idling times, harsh braking and driving, usage rates, fuel economy, and the like. Various data analytics may be implemented to process the telematics data. The telematics data may then be used to manage various aspects of the vehicle assets 120, such as route planning, vehicle maintenance, driver compliance, asset utilization, fuel management, etc., which, in turn, may improve productivity, efficiency, safety, and/or sustainability of the vehicle assets 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicle assets 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicle assets 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
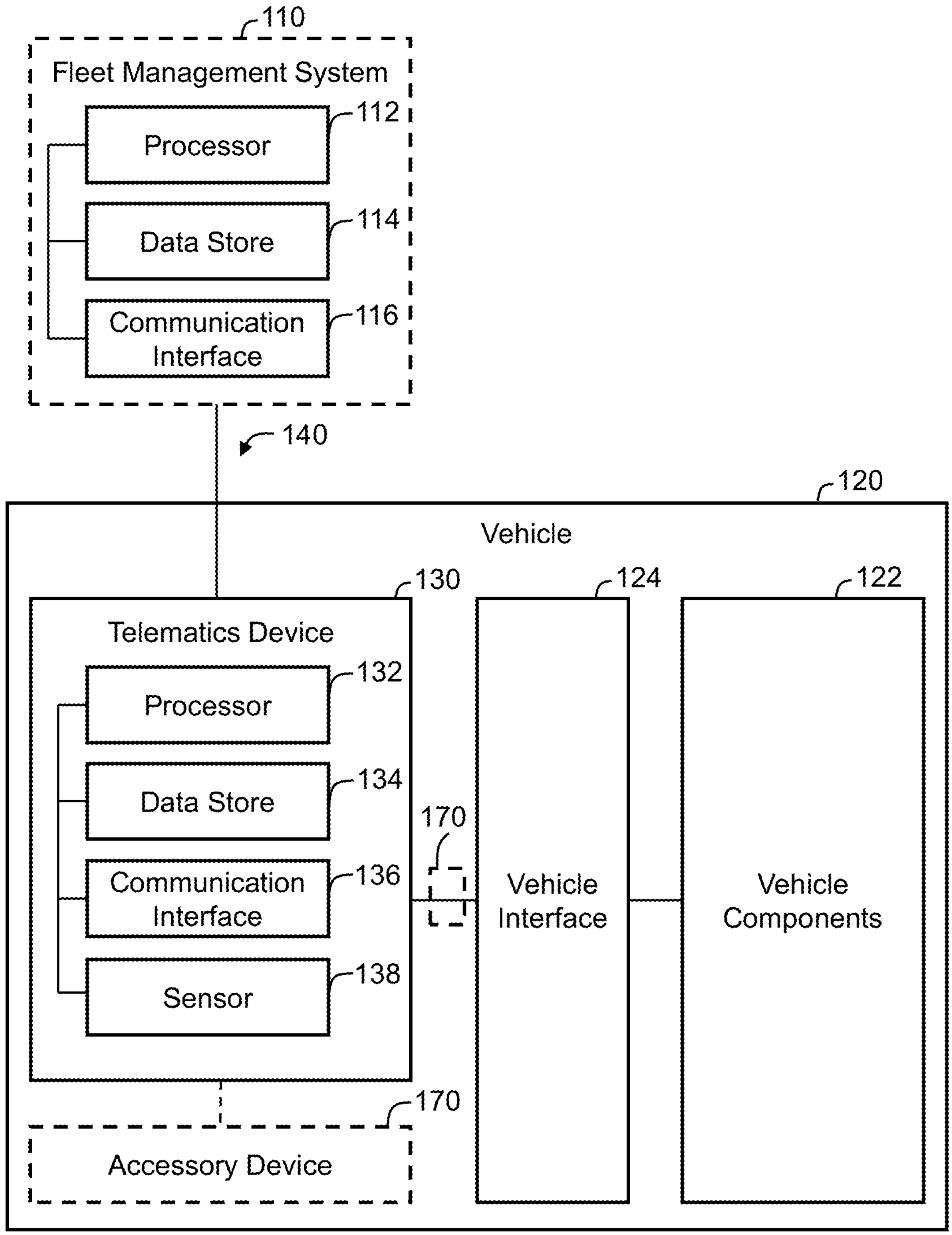
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicle assets 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect telematics data from the vehicle components 122 and/or sensor 138, to send telematics data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle assets 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
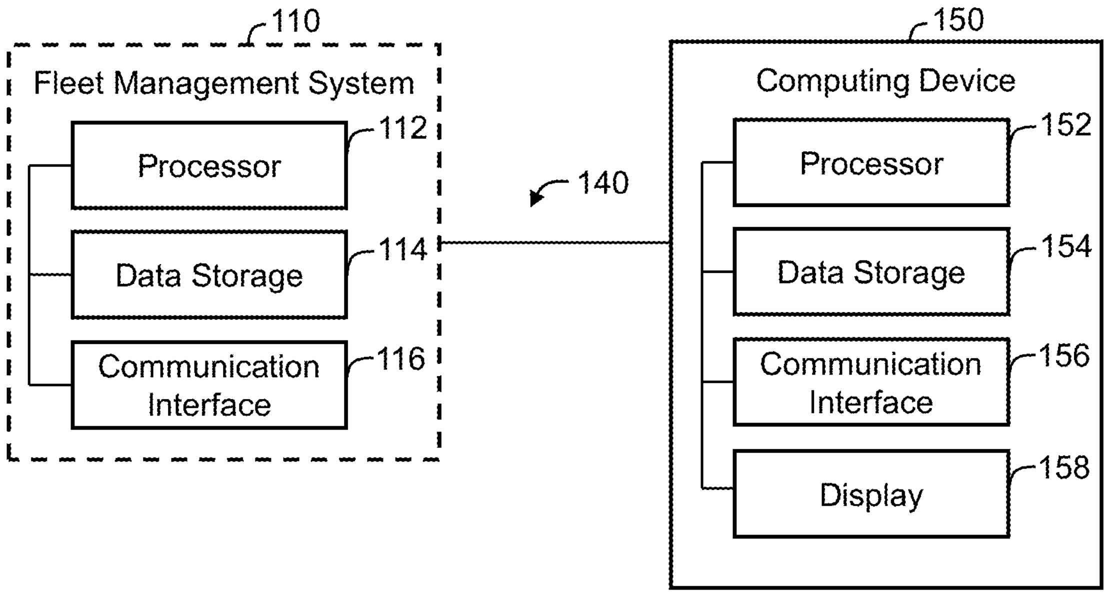
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
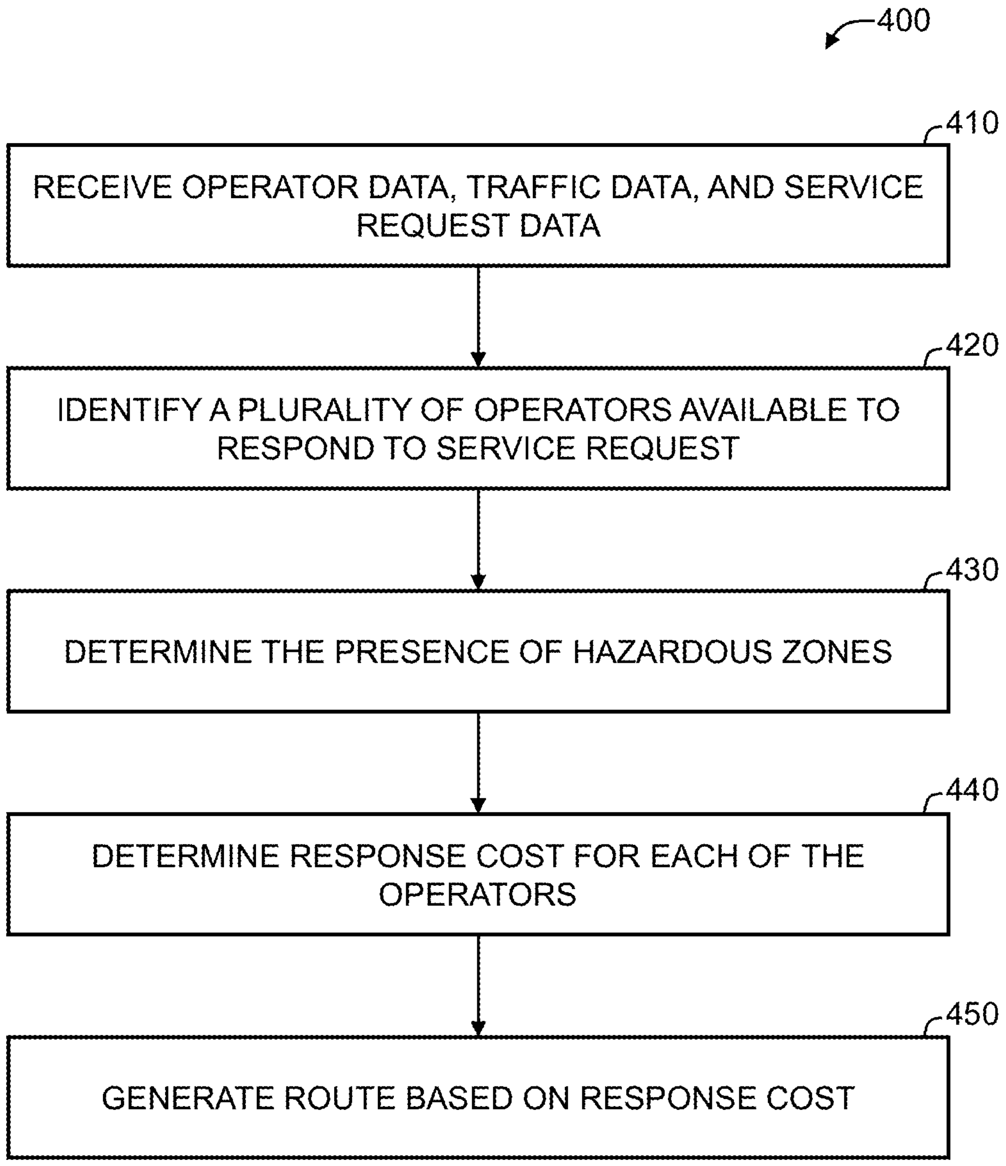
FIG. 4 is a flowchart of an example method for identifying a vehicle asset pairing, according to an embodiment of the present disclosure.

Referring now to FIG. 4, there is shown a method for identifying a vehicle asset pairing according to an example embodiment of the present disclosure. As shown, a method for identifying a vehicle asset pairing (400) may comprise operating at least one processor to: receive telematics data comprising geospatial data associated with a plurality of vehicle assets (410); identify, using the geospatial data, one or more positions of each of the plurality of vehicle assets reported within a selected timeframe (420); define a search zone based on a selected reported position of a selected vehicle asset (430); identify one or more candidate vehicle asset pairings, each candidate vehicle asset pairing being between the selected vehicle asset and a candidate vehicle asset having at least one reported position located within the search zone (440); identify, if the candidate vehicle asset has two or more reported positions within the search zone, a first reported position and a second reported position of the candidate vehicle asset (450); generate an interpolated position of the candidate vehicle asset based on the first reported position and the second reported position thereof that is most proximate the selected reported position of the selected vehicle asset for each candidate vehicle asset pairing (460); and identify the vehicle asset pairing based at least in part on a distance of the interpolated position of the candidate vehicle asset from the selected reported position of the selected vehicle asset of each candidate vehicle asset pairing (470).

The method 400 may be implemented using any suitable combination of hardware and software, such as those described in reference to FIG. 1 to FIG. 3. For example, one or more operations (e.g., operations 410, 420, 430, 440, 450, 460, and/or 470) of the method 400 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof. Further, as described herein, in some embodiments, the method 400 may be scalable in that thousands of vehicle assets, or more, may be considered when identifying vehicle asset pairings. Thus, it will be appreciated that the systems and methods of the present disclosure require implementation via a computer (e.g., one or more of the processors 112, 132, and 152).

At operation 410 of the method 400, telematics data comprising geospatial data associated with a plurality of vehicle assets may be received. As described herein, the vehicle assets (e.g., vehicle assets 120) may be any type of vehicle asset. For example, the plurality of vehicle assets may comprise unpowered vehicle assets (e.g., trailers, rail cars, etc.) and/or powered vehicle assets (e.g., motor vehicles such as cars, trucks, trains, etc.). The method 400 may be used to identify a vehicle asset pairing between vehicle assets of the plurality of vehicle assets. Generally, a vehicle asset pairing may be between a powered vehicle asset and an unpowered vehicle asset (e.g., a trailer coupled to a truck). However, it will be appreciated that other types of pairings may be identifiable by the systems and methods of the present disclosure. For example, the method 400 may be used to identify a vehicle asset pairing between two powered vehicle assets (e.g., a truck towing a car), a powered vehicle asset and multiple unpowered vehicle assets (e.g., a truck coupled to two trailers in tandem), etc.

As also described herein, the telematics data may include various types of data pertaining to the vehicle asset from which it is collected. In the context of the systems and methods of the present disclosure, the telematics data may include at least geospatial data associated with the plurality of vehicle assets such as, but not limited to, location data (e.g., GPS coordinates), speed data, acceleration data, and elevation data. The telematics data may be obtained from, for example, a telematics device (e.g., the telematics devices 130) installed on each of the plurality of vehicle assets. The geospatial data may be obtained using, for example, a GPS receiver (e.g., sensor 138) of such a telematics device installed in the vehicle assets, a speed sensor of the vehicle assets, etc. Additionally, or alternatively, geospatial data such as speed data may be derived from location data obtained from a telematics device.

In some embodiments, the telematics data may also include vehicle asset identifying data. Such identifying data may include information such as, but not limited to, unique IDs associated with each of the plurality of vehicle assets. As will be appreciated, the unique IDs may be useful for identifying particular vehicle assets. For example, it may be desirable to a user to identify vehicle asset pairings for a particular group of vehicle assets. As another example, it may also be desirable to identify whether a particular vehicle asset is engaged in a vehicle asset pairing.

The telematics data may be received using any suitable devices and systems, such as those described above in relation to FIG. 1 to FIG. 3. For example, the telematics data, and thus the geospatial data, may be received by one or more the telematics devices 130 (e.g., the processor 132), the fleet management system 110 (e.g., the processor 112), and the computing devices 150 (e.g., the processor 152), from one or more of the telematics devices 130 (e.g., the data storage 134), the fleet management system 110 (e.g. the data storage 112), and the computing devices 150 (e.g., the data storage 154).

As shown in FIG. 4, at operation 420, one or more positions of each of the plurality of vehicle reported within a selected timeframe may be identified using the geospatial data. The geospatial data associated with the plurality of vehicle assets may therefore include at least location data that may be used to identify the position or positions of the plurality of vehicle assets within the selected timeframe. The location data may include, for example, GPS coordinates (e.g., longitudinal values and latitudinal values) indicating the position of each vehicle asset at a certain time (i.e., the time of reporting of the geospatial data).

As indicated above, geospatial data obtained from the plurality of vehicle assets may be reported (e.g., to the at least one processor) at a certain frequency. Thus, the one or more positions identified represent the positions, or locations, of the plurality of vehicle assets at the time when the geospatial data associated therewith was reported. As will be appreciated, within a given timeframe, a vehicle asset may report telematics data comprising geospatial data (e.g., via a telematics device 130 installed therein) more than once, and, as a result, may have more than one reported position associated therewith.

Further, as described herein, the systems and methods of the present disclosure may be capable of using geospatial data associated with the plurality of vehicle assets reported at different frequencies to identify vehicle asset pairings therefrom (e.g., due to the vehicle assets being equipped with different types of telematics devices). Consequently, the positions of each of the plurality of vehicle assets may be reported at different times and, as a result, there may be a discrepancy between the most-recently reported positions of the vehicle assets and their actual, current positions. When using, for example, conventional techniques for identifying vehicle asset pairings, such discrepancies may be difficult to account for and can lead to the incorrect identification of vehicle asset pairings.

By identifying the one or more positions of each of the plurality of vehicle assets that were reported within a selected timeframe, vehicle assets reporting telematics data such as geospatial data associated therewith at different frequencies may be accommodated. The timeframe may be selected based on, for example, the geospatial data reporting frequencies of the vehicle assets (e.g., the telematics devices 130 installed on vehicle assets 120). In more detail, the timeframe may be selected such that at least one reporting of geospatial data by each vehicle asset occurs therein. Examples of suitable selected timeframes include the previous 10 seconds, 30 seconds, 1 minute, 5 minutes, 30 minutes, 1 hour, or any other desired timeframe.

At operation 430 of the method 400, a search zone may be defined based on a selected reported position of a selected vehicle asset. The selected vehicle asset may be a vehicle asset selected by a user to identify a potential vehicle asset pairing therewith. The selected reported position may be a position of the selected vehicle asset reported within the selected timeframe that may be used to identify a potential vehicle asset pairing, as will be described herein.

The search zone may be used to identify vehicle assets other than the selected vehicle asset that have reported a position within the selected timeframe that is proximate to the selected reported position of the selected vehicle asset. The search zone may therefore correspond to a geographical area within which the selected reported position of the selected vehicle asset is located.

The search zone may be defined using any suitable technique. For example, the search zone may be defined using a hierarchical geospatial indexing system. As will be appreciated, such systems divide the Earth's surface into a series of discrete global grids, made up of cells corresponding to geographical areas, with progressively finer resolution. Examples of suitable hierarchical geospatial indexing systems include ISEA discrete global grids (ISEA DGGs; e.g., ISEA3H)), COBE, quaternary triangular mesh (QTM), hierarchical equal area isoLatitude pixelation (HEALPix), hierarchical triangular mesh (HTM), geohash, S2 systems (e.g., S2Region, S2LatLng, and S2CellId), and the like.

In more detail, in some embodiments, the defining of the search zone may comprise operating the least one processor to: identify, based on a hierarchical geospatial indexing system, a first cell corresponding to a geographical area within which the selected reported position of the selected vehicle asset is located; determine a plurality of neighbouring cells based on the first cell; and define the search zone based on a geographical area corresponding to the first cell and the plurality of neighboring cells.

As described above, a variety of geospatial indexing systems may be used to define the search zone. Thus, the cells identified to define the search zone (i.e., the first cell and the neighboring cells) may be of different shapes and/or sizes, based on the geospatial indexing system used. For example, a QTM system may use triangular cells, while a geohash system may use rectangular cells. Further, it will be appreciated that, as the shape of the cells may vary, the number of neighboring cells may also vary. For example, in some embodiments, the plurality of neighboring cells may comprise cells that are directly adjacent the first cell (i.e., cells that share a border with the first cell). It is also noted that, in some embodiments the plurality of neighboring cells may comprise cells that are proximate the first cell based on, for example, cardinal and/or ordinal directions relative thereto. For example, in such embodiments, the neighboring cells may comprise cells that are located directly to the north, northeast, east, southeast, south, southwest, west, and/or northwest of the first cell.

Further, as described herein, each of the cells (i.e., the first cell and the neighboring cells) correspond to a geographical area. As will be appreciated, in hierarchical geospatial indexing systems, the cells thereof may be sized according to a selected resolution or level of precision. As a result, the resolution, or precision, of the cells affects the size of the geographical area corresponding thereto. In some embodiments, the precision of the cells may be selected such that each cell corresponds to a desired size of geographical area.

An example of the defining of the search zone (430) using a geohash system according to an embodiment is described herein for additional clarity and with reference to FIG. 5A to FIG. 5D. In that embodiment, the defining of the search zone based on the selected reported position of the selected vehicle asset may comprise operating the at least one processor to: generate, using a latitudinal value and a longitudinal value of the selected reported position, a first geohash corresponding to a geographical area within which the selected vehicle asset is located; determine a plurality of neighboring geohashes based on the first geohash; and define the search zone based on a geographical area corresponding to the first geohash and the plurality of neighboring geohashes.

As will be appreciated, in such hierarchal geospatial indexing systems, a geohash is a unique alphanumerical identifier of a specific geographical area (e.g., a rectangular geographical area), generated using latitudinal and longitudinal values (e.g., degrees) at a selected precision and therefore represents a "cell" as described above. As indicated above, the precision at which the geohash is generated affects the size of the geographical area represented thereby. For example, a geohash having a precision of 6 characters (i.e., a length of 6 characters) will represent a smaller, more precise (i.e., higher resolution) geographical area than a geohash having a precision of 5 characters. Generally, the more precise the longitudinal value and the latitudinal value, the more precise a geohash generated therefrom may be. In some embodiments, the first geohash and the neighbouring geohashes each have a precision of 6 characters. In such embodiments, each geohash may represent a geographical area of about 8,010,494.380 $ft^2$ (about 744,200 $m^2$ or about 0.7442 $km^2$). Of course, as described above, other levels of precision may be used if so desired.

In the above example, the generating of the first geohash based on a latitudinal value and a longitudinal value of the selected reported position of the selected vehicle asset may be performed using any suitable technique and/or algorithm. For example, the longitudinal and latitudinal values of the selected vehicle asset may be converted to a geohash by mapping each of the values to a 32-bit integer (e.g., by re-scaling the latitudinal and longitudinal values), interleaving the 32-bit integers to produce a 64-bit integer, dividing the 64-bit integer into twelve 5-bit chunks, each of which may then be mapped to an alphanumeric integer of a string that forms the geohash.

Figure 5A:
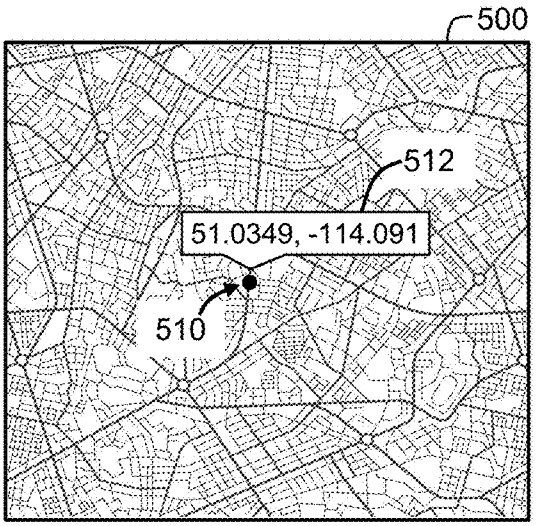
FIG. 5A to FIG. 5D illustrate an example process for defining a search zone based on a selected reported position of a selected vehicle asset, according to an embodiment of the present disclosure.
Figure 5B:
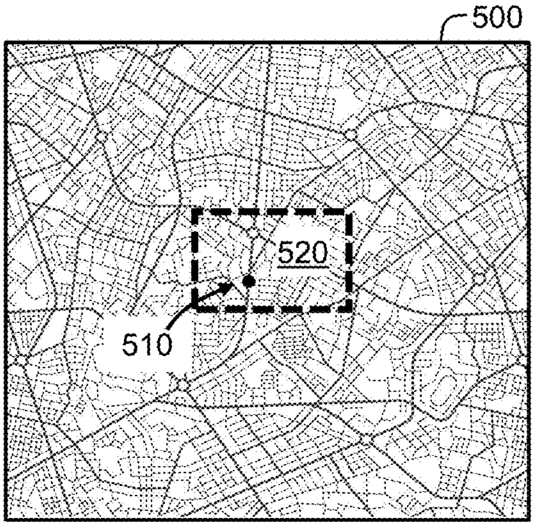

Referring now to FIG. 5A, there is shown a geographical region 500 having a selected reported position 510 of a selected vehicle asset located therein. The selected reported position 510 has longitudinal and latitudinal values 512 associated therewith. As described above, the longitudinal and latitudinal values 512 may be converted to a first geohash representing a geographical area 520 within which is located the selected reported position 510 of the selected vehicle asset, as shown in FIG. 5B.

Figure 5C:
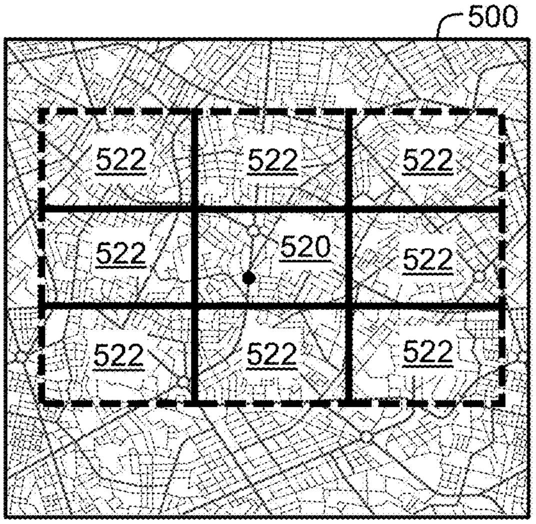

Once the first geohash is generated, the neighboring geohashes, representing neighboring geographical areas, may be determined. FIG. 5C shows a plurality of geographical areas 522, which correspond to the determined neighboring geohashes. As shown in the illustrated example, the neighboring geographical areas 522 may be those located directly to the north, northeast, east, southeast, south, southwest, west, and/or northwest of the geographical area 520 represented by the first geohash. The neighbouring geohashes may be determined using any suitable technique. For example, neighbouring geohashes may be determined using a lookup table based on the first geohash.

Figure 5D:
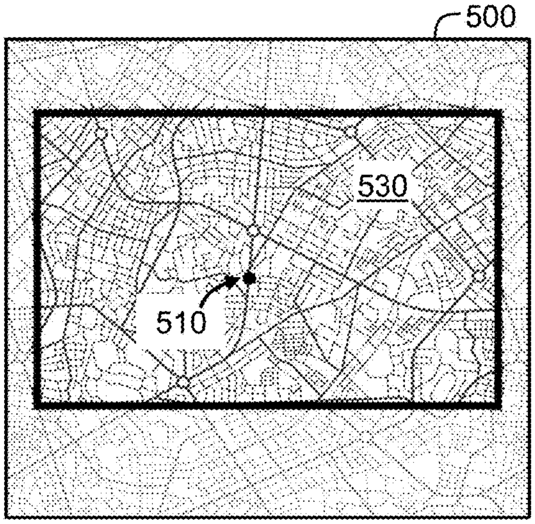

The combination of geographical area 520 corresponding to the first geohash and the geographical areas 522 corresponding to the neighbouring geohashes, once determined, may represent a search zone 530, as shown in FIG. 5D.

Referring back to FIG. 4, as shown at operation 440, one or more candidate vehicle asset pairings may be identified. Each of the one or more candidate vehicle asset pairings may be between the selected vehicle asset and a candidate vehicle asset having at least one reported position located within the search zone. That is, each candidate vehicle asset pairing may represent a potential vehicle asset pairing between the selected vehicle asset and a candidate vehicle asset that has at least one reported position proximate that of the selected reported position of the selected vehicle asset.

The identifying of the one or more candidate vehicle asset pairings may be particularly useful for, for example, users managing a large fleet, such as those in freight transport industries. In more detail, by identifying one or more candidate vehicle asset pairings, vehicle assets that are not potentially paired with the selected vehicle asset may be filtered, or removed, from further consideration by the methods and systems of the present disclosure (e.g., based on their reported positions not being within the search zone). As will be appreciated, removing such vehicle assets may improve the efficiency of the systems and methods described herein (e.g., in terms of processing requirements), especially if a user is managing a great number of vehicle assets, such as thousands of vehicle assets, or more.

As described above, the identifying of the one or more candidate vehicle asset pairings may be based at least on a proximity of reported position of a candidate vehicle asset relative to the selected reported position of the selected vehicle asset (i.e., whether any reported positions are within the search zone). However, as also described above, the reported positions of the candidate vehicle assets may each have been reported at a different time than that of the selected reported position of the selected vehicle asset. Thus, in some embodiments, it may be useful to also take into account the time at which the at least one position of the candidate vehicle asset was reported within the search zone. For example, in such embodiments, the identifying of the one or more candidate vehicle asset pairings may further comprise operating the at least one processor to identify the one or more candidate vehicle asset pairings based at least in part on a difference between a reporting time of the selected reported position of the selected vehicle candidate and a reported time of each of the at least one reported positions of the candidate vehicle asset.

In the above embodiments, a particular time difference threshold may be selected by a user based on a number of factors. For example, as described above, different vehicle assets may report telematics data including geospatial data associated therewith at difference frequencies (e.g., due to different types of telematics devices 130 installed thereon). As a result, in some embodiments, the time difference threshold may be based on a reporting frequency of each of the one or more of the candidate vehicles assets. In more detail, if, for example, the candidate vehicle assets report telematics data comprising geospatial data at a certain frequency, it may be beneficial to take into account only positions of candidate vehicle assets that were reported within a timeframe corresponding to that frequency, relative to the time of reporting of the selected reported position of the selected vehicle asset. As will be appreciated, positions reported outside of that timeframe may, in some cases, less-accurately represent the location of the candidate vehicle assets at the time of reporting of the selected reported position of the selected vehicle asset.

Further, in some embodiments, in addition to the proximity of the at least one reported position of the candidate vehicle asset relative to the selected reported position of the selected vehicle asset (i.e., the at least one reported position of the candidate vehicle asset being within the defined search zone), it may also be useful to consider other types of geospatial data when identifying the one or more candidate vehicle asset pairings. For example, if multiple reported positions of multiple candidate vehicle assets are proximate the selected reported position of the selected vehicle asset (e.g., within the search zone) it may be beneficial to consider geospatial data such as speed data to further distinguish candidate vehicle asset pairings.

As will be appreciated, speed data may represent the velocity, or rate of locational change of a vehicle asset (e.g., a vehicle asset 120). The speed data may be obtained, for example, by a telematics device (e.g., the telematics device 130) installed in the vehicle asset. The telematics device may obtain the speed data from a vehicle speed sensor (VSS) installed in the powertrain and/or ABS of the vehicle asset (e.g., via the vehicle interface 122). However, as described herein, the plurality of vehicle assets may comprise unpowered vehicle assets, which may not have a powertrain and/or ABS. In such situations, the speed data may instead be determined based on changes in location data over time, for example, obtained via a GPS receiver (e.g., the sensor 138) of a telematics device installed therein.

By considering speed data, candidate vehicle asset pairings may be further identified based on the similarity in speed between the selected vehicle asset at the time of reporting the selected reported position and the candidate vehicle asset at the time of reporting the at least one position within the search zone. In more detail, as will be appreciated, while a candidate vehicle asset may have a reported position that is proximate the selected vehicle asset, if the speed data associated with each thereof is substantially different, it may indicate that the candidate vehicle asset is not paired with the selected vehicle asset and that a candidate vehicle asset pairing should not be identified therefrom.

Thus, in some embodiments, the identifying of the one or more candidate vehicle asset pairings may further comprise operating the at least one processor to identify the one or more candidate vehicle asset pairings based at least in part on a difference in speed between the selected vehicle asset at the selected reported position and the candidate vehicle asset at each of the at least one reported positions of the candidate vehicle asset. As indicated above, the difference in speed may be based on a predetermined threshold. That is, in some embodiments, if the difference in speed is greater than a predetermined threshold, the candidate vehicle asset may not be identified as a part of a candidate vehicle asset pairing with the selected vehicle asset. Examples of suitable predetermined speed difference thresholds include 5 mph (about 8 km/h), 10 mph (about 16 km/h), 15 mph (about 24 km/h), etc., or any speed difference therebetween.

At operation 450 of the method 400 shown in FIG. 4, for each candidate asset pairing, if the candidate vehicle asset has two or more reported positions within the search zone, a first reported position and a second reported position thereof may be identified. That is, if the candidate vehicle asset has more than one reported position (i.e., reported within the selected time frame, as described above) within the search zone, one of the reported positions may be identified as the first reported position and another of the reported positions may be identified as the second reported position. The first and second reported positions may be used to identify the vehicle asset pairing.

As described above, the plurality of vehicle assets may report telematics data comprising geospatial data at different frequencies. Thus, the positions of the candidate vehicle assets and the selected vehicle asset may have been reported at different times. It may therefore be useful to estimate a position of the candidate vehicle assets at about the time that the selected reported position of selected vehicle asset was reported.

In some embodiments, one of the first reported position and the second reported position of the candidate vehicle asset occurs prior to the selected reported position of the selected vehicle asset, and the other of the first reported position and the second reported position of the candidate vehicle asset occurs after to the selected reported position of the selected vehicle asset. As will be appreciated, by using positions of candidate vehicle assets reported at different times, an estimate of a position of the candidate vehicle assets at about the time that the selected reported position of selected vehicle asset was reported may be generated. In such embodiments, the first reported position and the second reported position may be identified using any suitable technique.

For example, a first most proximate (e.g., based on distance and/or temporally relative to the selected reported position) position of the candidate vehicle may be identified using geospatial data, and the time at which that first most proximate position was reported may be compared to that of the selected reported position of the selected vehicle asset to determine whether the reporting of the first most proximate position occurred thereafter or prior thereto. A second most proximate position may then be identified using the geospatial data, for example, by ranking other reported positions based on distance and/or temporally relative to the selected reported position. Based on the first most proximate position, the second most proximate position may occur after or prior to the selected reported position. For example, if the first most proximate position occurs prior to the reporting of the selected reported position of the selected vehicle asset, the second most proximate position may occur after the reporting of the selected reported position.

Once the first reported position and, if present, second reported position of the candidate vehicle of each of the candidate vehicle assets are identified, they may be used to identify the vehicle asset pairing. In more detail, as shown at 460 of FIG. 4, based on the first reported position and the second reported position, an interpolated position of the candidate vehicle asset that is most proximate (e.g., based on distance and/or temporally) the selected reported position of the selected vehicle asset may be generated for each candidate vehicle asset pairing.

The interpolated position of the candidate vehicle asset is a position of the candidate vehicle asset that is not reported (e.g., by a telematics device 130 installed on a vehicle asset 130) but is instead generated based on the telematics data reported thereby. In more detail, the interpolated position may be generated using reported telematics data comprising geospatial data such as location data (e.g., the first and second reported positions of the candidate vehicle asset), speed data (e.g., based on the location data of, or obtained from a VSS of, the candidate vehicle asset), etc.

For example, in some embodiments, the interpolated position may be generated between the first and second reported positions of the candidate vehicle asset at a point that is most proximate the selected reported position of the selected vehicle asset based on distance. As will be appreciated, in such embodiments, the interpolated position may be generated using the location data reported from the candidate vehicle asset and the selected vehicle asset.

As a further example, as described above, in some embodiments, of the first reported position and the second reported position of the candidate vehicle asset may occur prior to the selected reported position of the selected vehicle asset, and the other of the first reported position and the second reported position of the candidate vehicle asset may occur after to the selected reported position of the selected vehicle asset. In such embodiments, the interpolated position may be generated a point between the first and second reported positions of the candidate vehicle asset that is most proximate the selected reported position of the selected vehicle asset temporally using location data and speed data associated with each thereof. In more detail, by using the first and second reported positions (i.e., location data) and speed of the candidate vehicle asset at each thereof (i.e., speed data) the interpolated position may be generated such that it represents an estimated position of the candidate vehicle asset at about the time of the reporting of the selected reported position of the selected vehicle asset. As will be appreciated, by using the locations and speed of a candidate vehicle asset, a position between the locations at a particular time may be estimated. It is noted that, if the speed data of the candidate vehicle asset indicates a speed change between the first reported position and the second reported position, the reported speeds may be processed together (e.g., averaged) to provide an estimated speed. Otherwise, as will be appreciated, the speed of the candidate vehicle asset may be assumed to be constant.

As well, in some embodiments, it may be useful to assume that the direction of travel of a candidate vehicle asset remains constant between the first reported position and the second reported position thereof. For example, the interpolated position may be generated along a line extending between the first reported position and the second reported position of the candidate vehicle asset. That is, in such embodiments, the candidate vehicle asset is assumed to travel in a straight line from the first reported position thereof to the second reported position thereof. Such embodiments may simplify the generation of the interpolated position of the candidate vehicle asset (e.g., using the telematics data comprising geospatial data reported thereby) and, as a result, may be useful when vehicle asset pairings are to be identified within a large fleet, as processing requirements (e.g., by one or more of the processors 112, 132, and 152) may be reduced.

For illustrative purposes, an example of a process for generating an interpolated position of a candidate vehicle asset based on first and second reported positions thereof according to an embodiment of the present disclosure is described below with reference to FIG. 6A to FIG. 6C.

Figure 6A:
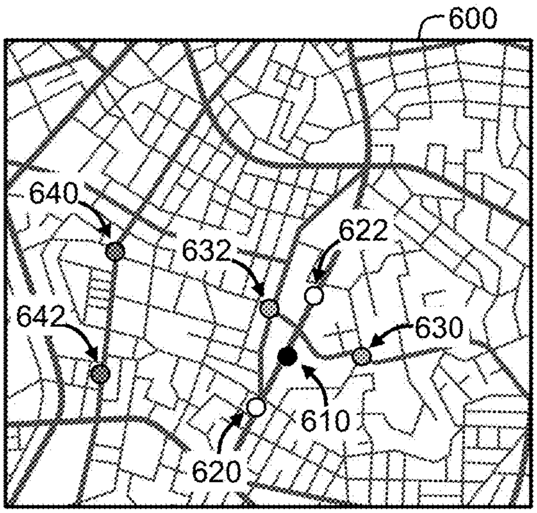
FIG. 6A to FIG. 6C illustrate an example process for generating an interpolated position of a candidate vehicle asset of a candidate vehicle asset pairing, according to an embodiment of the present disclosure.

As shown in FIG. 6A, a search zone 600 defined based on a selected reported position 610 of a selected vehicle asset has identified therein first and second reported positions 620, 622 of a first candidate vehicle asset, first and second reported positions 630, 632 of a second candidate vehicle asset, and first and second reported positions 640, 642 of a third candidate vehicle asset.

As described herein, interpolated positions of the candidate vehicle assets may in some embodiments be generated along a line extending between the first and second reported positions thereof. FIG. 6B shows a line 624 extending between the first and second reported positions 620, 622, a line 634 extending between the first and second reported positions 630, 632, and a line 644 extending between the first and second reported positions 640, 642.

In the illustrated embodiment, the interpolated positions of each of the first, second, and third candidate vehicle assets may be generated along each of the lines 624, 634, and 644, respectively. As shown in FIG. 6C, an interpolated position 626 may be generated along the line 624, an interpolated position 636 may be generated along the line 634, and an interpolated position 646 may be generated along the line 644, each at a point therealong that is most proximate (e.g., based on distance and/or temporally, as described herein) the selected reported position 610 of the selected vehicle asset.

Figure 6B:
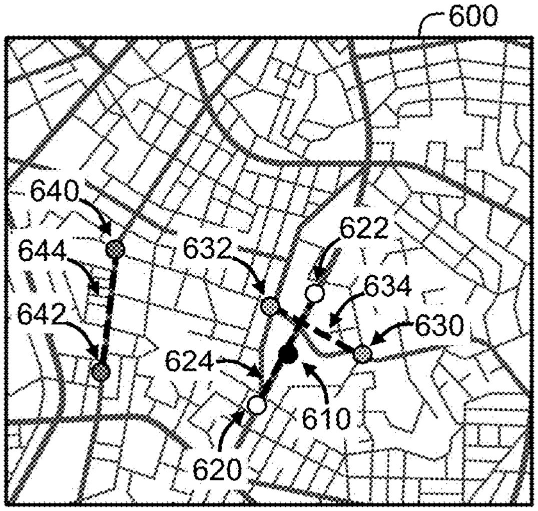
Figure 6C:
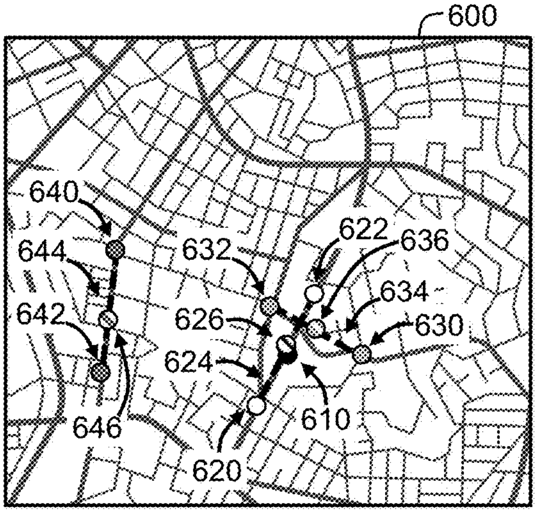

It is noted that, while the embodiment illustrated in FIG. 6A to FIG. 6C involves generating interpolated positions for three candidate vehicle asset pairings, there may be more, or fewer, candidate vehicle asset pairings based on, for example, the size of a fleet managed by a user. Once the interpolated positions 626, 636, 646 of the first, second, and third candidate vehicle asset pairings are generated, a vehicle asset pairing may be identified based thereon, as will be described herein.

It as further noted that, in the embodiment illustrated in FIG. 6A to FIG. 6C, each candidate vehicle asset has a first and second reported position that were reported prior to, and after, the reporting of the selected reported position 610, respectively. However, it will be appreciated that it may not always be the case that a candidate vehicle asset reports a position prior to, and after, the reporting of the selected reported position of the selected vehicle asset. For example, a candidate vehicle asset may have only one position reported within the search zone, or a candidate vehicle asset may have reported multiple positions within the search zone that are all either prior to, or after, the reporting of the selected reported position of the selected vehicle asset. In such cases, it may be useful to generate the interpolated position using an alternative technique than that illustrated in FIG. 6A to FIG. 6C.

For example, in some embodiments, if a candidate vehicle asset has only one reported position located within the search zone, the interpolated position thereof may be generated based on that reported position. In another example, if the first reported position and the second reported position of a candidate vehicle asset are both reported prior to, or after, the selected reported position of the selected vehicle asset, the interpolated position may be generated based on the reported position that is most proximate (e.g., based on distance and/or temporally) to that of the selected reported position. In such embodiments, the one reported position, or the position that is most proximate to the selected reported position, may, for example, be used as the interpolated position.

In more detail, referring back to FIG. 4, at 470 the vehicle asset pairing may be identified based at least in part on a distance of the interpolated position of the candidate vehicle asset from the selected reported position of the selected vehicle asset of each candidate vehicle asset pairing. For example, in some embodiments, the interpolated positions of each of the candidate vehicle asset pairings may be ranked based on the distances thereof from the selected reported position of the selected vehicle asset and the candidate vehicle asset pairing having the interpolated position that is closest to the selected reported position may be identified as the vehicle asset pairing.

In some cases, it may be desirable to identify the vehicle asset pairing based on factors (e.g., other types of telematics data) in addition to the distance of the interpolated position of each of the candidate vehicle asset pairings relative to the selected reported position of the selected vehicle asset (i.e., based on location data). For example, if there are many candidate vehicle asset pairings identified (e.g., many candidate vehicles report at least one position within the search zone) it may be useful to identify the vehicle asset pairing based on additional criteria provided by other types of telematics data so as to further distinguish the actual vehicle asset pairing from other candidate vehicle asset pairings. Such embodiments may be particularly useful for, for example, users managing a large fleet of vehicle assets.

For example, the identifying of the vehicle asset pairing may be based on additional telematics data such as geospatial data, including, but not limited to, speed data. As described herein, the geospatial data reported by the plurality of vehicle assets may include speed data indicating the speed of the plurality of vehicle assets at the time of reporting. Such speed data may be used in the identification of the vehicle asset pairing (e.g., in addition to location data) by comparing the speed data of the candidate vehicle assets and that of the selected vehicle asset. In more detail, the selected vehicle asset at the selected reported position may have associated therewith a selected vehicle asset speed; each candidate vehicle asset at the first reported position may have associated therewith a first vehicle asset speed; each candidate vehicle asset at the second reported position may have associated therewith a second vehicle asset speed; and each candidate vehicle asset at the interpolated position thereof may have associated therewith an interpolated vehicle asset speed based at least in part on the first vehicle asset speed and the second vehicle asset speed of the candidate vehicle asset.

In some embodiments, the identifying of the vehicle asset pairing may comprise operating the at least one processor to: determine, for each candidate vehicle asset pairing: an asset distance difference based on the distance of the interpolated position of the candidate vehicle asset from the selected reported position of the selected vehicle asset (e.g., as indicated above); and an asset speed difference based on a difference between the interpolated vehicle asset speed of the candidate vehicle asset and the selected vehicle asset speed of the selected vehicle asset; and identify the vehicle asset pairing based on the asset distance difference and the asset speed difference of each of the one or more candidate vehicle asset pairings.

That is, a difference in distance (i.e., the asset distance difference) and a difference in speed (i.e., the asset speed difference) between the candidate vehicle asset may be used to compare the identified candidate vehicle asset pairings to identify the vehicle asset pairing therefrom. In some embodiments, the identifying of the vehicle asset pairing may further comprise operating the at least one processor to: rank the one or more candidate vehicle asset pairings based on the asset distance difference and the asset speed difference associated with each thereof; and select one of the one or more candidate vehicle asset pairings as the vehicle asset pairing based on the ranking thereof.

The ranking may be performed on any suitable basis—e.g., as selected by a user. For example, in some embodiments, the asset distance difference (i.e., the distance between the selected reported position of the selected vehicle asset and the interpolated position of the candidate vehicle asset) may have a greater weighting than the asset speed difference (i.e., the difference in speed of the selected vehicle asset at the selected reported vehicle position and of the candidate vehicle asset at the interpolated position) when ranking the one or more candidate vehicle asset pairings. Such embodiments may be useful, for example, when the identified candidate vehicle assets are travelling at similar speeds (e.g., along highways). Alternatively, in some embodiments, the asset distance difference may be weighted less than the asset speed difference when ranking each of the one or more candidate vehicle asset pairings. Such embodiments may be useful, for example, when many candidate vehicle assets are present within a close proximity of the selected reported position of the selected vehicle asset.

The above-described example embodiments generally relate to the use of telematics data comprising geospatial data to identify the vehicle asset pairing. However, in addition, or alternatively, other types of telematics data may be used in the identifying of the vehicle asset pairing. For example, in some embodiments, the telematics data may further comprise map data. As will be appreciated, map data may include information identifying various infrastructural features, topographical features, etc. of a geographical region such as, but not limited to, roads, streets, avenues, alleyways, highways, freeways, rivers, hills, mountains, and the like. Map data may be obtained from, for example, a map information provider such as OpenStreetMap (OSM) and included with other telematics data.

In embodiments where the telematics data comprises map data, the identifying of the vehicle asset pairing may comprise operating the at least one processor to: identify a first road segment having the selected reported position of the selected vehicle asset thereon; identify, for each of the one or more candidate vehicle asset pairings, a second road segment having the interpolated position, or a reported position that is closest to the selected reported position temporally or based on proximity, of the candidate vehicle asset thereon; and identify the vehicle asset pairing based at least in part on whether the selected road segment and the candidate road segment are a same type of road segment.

In more detail, in such embodiments, a road segment generally refers to at least a portion of a roadway. A road segment type may generally refer to the type of roadway associated with the road segment, such as, but not limited to, a road, street, avenue, alleyway, highway, freeway, parking lot, etc. Thus, the vehicle asset pairing may be identified, at least in part, by determining whether the selected vehicle asset and the candidate vehicle asset are present along the same type of road segment, or in some embodiments, the same road segment. For example, if the selected reported position of the selected vehicle asset is determined to be along a highway and an interpolated position of a candidate vehicle asset is determined to be along a street, it may indicate that that candidate vehicle asset is not paired to the selected vehicle asset.

As will be appreciated, it may be the case that multiple candidate vehicle assets are located on the same type of road segment as the selected vehicle asset, or that multiple candidate vehicle assets are located on the same road segment as the selected vehicle asset. In such cases, it may be useful to additionally identify the vehicle asset pairings based on a difference in distance between the interpolated position of the candidate vehicle asset to the selected reported position of the selected vehicle asset, a difference in speed between the candidate vehicle asset at the interpolated position and the selected vehicle asset at the selected reported position, or a combination thereof.

Once the vehicle asset pairing is identified, it may in some cases be desirable to determine additional information about that vehicle asset pairing. For example, in some embodiments, the method 400 may further comprise operating the at least one processor to determine a location, a time, or combination thereof corresponding to when the vehicle asset pairing occurred and/or terminated. Such information about the vehicle asset pairing may be determined using a variety of techniques and/or indicators. In more detail, in some embodiments, the determining of the location, the time, or the combination thereof corresponding to when the vehicle asset pairing occurred and/or terminated may comprise, for example, operating the at least one processor to: propagate geospatial data associated with the vehicle asset pairing backwards or forwards temporally until the vehicle asset pairing is at rest; determine that a speed difference between the vehicle assets of the vehicle asset pairing exceeds a predetermined threshold; determine that the selected vehicle asset is paired with a different candidate vehicle asset; or a combination thereof.

In more detail, the temporal propagation of the geospatial data associated with the vehicle asset pairing generally refers to identifying reported positions of the identified vehicle asset pairing as time progresses, or backwards through time, to determine a point at which the vehicle asset pairing is, or was, at rest. As will be appreciated, the vehicle asset pairing being at rest may indicate the beginning or end of a trip, which, in turn, may indicate the location and/or time at which the vehicle asset pairing occurred and/or terminated.

The determining of the speed difference between the vehicle assets of the identified vehicle asset pairing may generally involve using the telematics data (e.g., geospatial data) to determine the speed of each of the vehicle assets of the vehicle asset pairing at each position reported thereby, and comparing the speed of each of the vehicle assets at each reported point to determine whether there is the speed difference exceeds a predetermined threshold. As will be appreciated, a speed difference between the vehicle assets of a vehicle asset pairing may indicate that the vehicle assets are no longer paired. The predetermined threshold may be defined by a user and may, for example, be selected based on an expected error value of the determined speed for each the vehicle assets of the vehicle asset pairings. For example, in some embodiments, the predetermined threshold may be about 15 mph, or greater, or less, if so desired.

The determining that the selected vehicle asset is paired with a different candidate vehicle asset may generally involve, for example, implementing the systems and methods described herein again, after identifying a first vehicle asset pairing involving the selected vehicle asset. In such examples, if the selected vehicle asset is determined to be paired with another candidate vehicle asset, the previous pairing may be determined to have terminated, and the current pairing may be determined to have occurred.

As described herein, the systems and methods of the present disclosure may afford a number of advantages over conventional techniques for vehicle asset pairing identification. For example, the systems and methods of the present disclosure may also, in some embodiments, not require the use of proprietary systems (e.g., a specific telematics device installed on both unpowered and powered assets) and may instead be implementable using a variety of types of telematics devices. For example, in some embodiments, the systems and methods of the present disclosure are capable of using geospatial data reported from vehicle assets at different frequencies. As will be appreciated, different types of, for example, telematics devices may be used to report telematics data comprising geospatial data, which may report telematics data at different frequencies. In addition to the techniques for mitigating discrepancies in reporting frequencies outlined above (e.g., using telematics data reported within a specific timeframe, the generation of the interpolated positions of the candidate vehicle assets, etc.), the implementation of the systems and methods of the present disclosure may be further allow telematics data reported at different frequencies to be used.

For example, in some embodiments, the selected vehicle asset may report telematics data associated therewith at a first frequency and the candidate vehicle asset may report telematics data associated therewith at a second frequency. If, in such embodiments, the first frequency is less than the second frequency, the at least one processor (e.g., one or more of the processors 112, 132, 152) may be operable to perform one or more operations (e.g., one or more of operations 410, 420, 430, 440, 450, 460, 470) upon receipt of the telematics data associated with the selected vehicle asset, as that data is reported less frequently than that of the candidate vehicle asset.

As will be appreciated, the systems and methods of the present disclosure being capable of using telematics data reported at different frequencies to identify vehicle asset pairings may allow a user to implement the systems and methods without the need for, for example, proprietary devices, as described above. Such features may be useful for users managing a large fleet as the currently installed telematics devices may be used with the systems and methods described herein and, if the user decides to change the telematics devices (e.g., to upgrade older devices), the devices on every vehicle asset of the fleet do not need to be changed at the same time for the systems and methods of the present disclosure to operate.

Further, as described herein, in some embodiments, the vehicle asset pairing identification may be performed during a trip (i.e., the vehicle assets are in motion). As described herein, conventional techniques for vehicle asset pairing identification may involve, for example, an operator or other authorized user sending an indication to a system that the pairing has occurred or terminated, or a telematics device on one of the vehicle assets of the vehicle asset pairing indicating to a telematics device of the other vehicle asset indicating that the pairing has occurred or terminated. In contrast, the systems and methods of the present disclosure are capable of identifying vehicle asset pairings after a trip has started without requiring such an indication to be sent, and instead based on telematics data associated with each of the vehicle assets of the vehicle asset pairings.

Further, as also described herein, the systems and methods of the present disclosure may also, in some embodiments, not require the use of proprietary systems (e.g., a specific telematics device installed on both unpowered and powered assets) and may instead be implementable using a variety of types of telematics devices. For example, in some embodiments, the systems and methods of the present disclosure are capable of using geospatial data reported from vehicle assets at different frequencies. As will be appreciated, in such embodiments, different types of, for example, telematics devices may be used to report telematics data comprising geospatial data. Such embodiments may be useful for users managing a large fleet as the currently installed telematics devices may be used with the systems and methods of the present disclosure and, if the user decides to change the telematics devices (e.g., to upgrade older devices), the devices on every vehicle asset of the fleet do not need to be changed at the same time for the systems and methods of the present disclosure to operate.

Furthermore, the systems and methods described herein may be suitable for parallel implementations, meaning that multiple vehicle asset pairings may be identified at the same time (i.e., in parallel). Such implementations may be achievable due at least in part to the efficiency of the systems and methods of the present disclosure. For example, as described above, the systems and methods of the present disclosure may be particularly efficient with respect to processing requirements (e.g., by one or more of the processors 112, 132, 152). As also described above, another advantage relating to the efficiency of the methods and systems of the present disclosure is that they may be particularly scalable, meaning that may be capable of identifying vehicle asset pairings within small vehicle fleets (e.g., less than a hundred vehicle assets) as well as large vehicle fleets (e.g., thousands of vehicle assets). As a result, the systems and methods for identifying vehicle asset pairings described herein may be suitable for implementation by a variety of users operating within a variety of industries.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for identifying a vehicle asset pairing, the system comprising:

at least one data storage operable to store telematics data, the telematics data comprising geospatial data associated with a plurality of vehicle assets; and at least one processor in communication with the at least one data storage, the at least one processor operable to:

receive the geospatial data associated with the plurality of vehicle assets;

identify, using the geospatial data, one or more positions of each of the plurality of vehicle assets reported within a selected timeframe;

define a search zone based on a selected reported position of a selected vehicle asset, the search zone defined using a hierarchical geospatial indexing system;

identify one or more candidate vehicle asset pairings, each candidate vehicle asset pairing being between the selected vehicle asset and a candidate vehicle asset having at least one reported position located within the search zone;

identify, if the candidate vehicle asset has two or more reported positions within the search zone, a first reported position and a second reported position of the candidate vehicle asset;

generate an interpolated position of the candidate vehicle asset based on the first reported position and the second reported position thereof that is most proximate the selected reported position of the selected vehicle asset for each candidate vehicle asset pairing; and identify the vehicle asset pairing based at least in part on a distance of the interpolated position of the candidate vehicle asset from the selected reported position of the selected vehicle asset of each candidate vehicle asset pairing.

2. The system of claim 1, wherein the at least one processor is operable to define the search zone by:

identifying, based on the hierarchical geospatial indexing system, a first cell corresponding to a geographical area within which the selected reported position of the selected vehicle asset is located;

determining a plurality of neighboring cells based on the first cell; and defining the search zone based on a geographical area corresponding to the first cell and the neighboring cells.

3. The system of claim 2, wherein the hierarchical geospatial indexing system is a geohash system.

4. The system claim 1, wherein the at least one processor is further operable to identify the one or more candidate vehicle asset pairings based at least in part on a difference between a reporting time of the selected reported position of the selected vehicle asset and a reporting time of each of the at least one reported positions of the candidate vehicle asset, a difference in speed between the selected vehicle asset at the selected reported position and the candidate vehicle asset at each of the at least one reported positions of the candidate vehicle asset, or a combination thereof.

5. The system of claim 1, wherein, if one of the first reported position and the second reported position of the candidate vehicle asset occur prior to the selected reported position of the selected vehicle asset, and the other of the first reported position and the second reported position of the candidate vehicle asset occur after to the selected reported position of the selected vehicle asset, the at least one processor is operable to generate the interpolated position between the first reported position and the second reported position of the candidate vehicle asset for each candidate vehicle asset pairing.

6. The system of claim 5, wherein the at least one processor is operable to generate the interpolated position along a line extending between the first reported position and the second reported position of the candidate vehicle asset for each candidate vehicle asset pairing.

7. The system of claim 1, wherein, if the candidate vehicle asset has only one reported position located within the search zone, the at least one processor is operable to generate the interpolated position thereof based on that reported position.

8. The system of claim 1, wherein, if both of the first reported position and the second reported position of the candidate vehicle asset occur prior to, or after, the selected reported position of the selected vehicle asset, the at least one processor is operable to generate the interpolated position thereof based on a most proximate of the first reported position and the second reported position relative to the selected reported position.

9. The system of claim 1, wherein:

the selected vehicle asset at the selected reported position has associated therewith a selected vehicle asset speed, each candidate vehicle asset at the first reported position has associated therewith a first vehicle asset speed, each candidate vehicle asset at the second reported position has associated therewith a second vehicle asset speed, each candidate vehicle asset at the interpolated position thereof has associated therewith an interpolated vehicle asset speed based at least in part on the first vehicle asset speed and the second vehicle asset speed of the candidate vehicle asset; and the at least one processor is operable to identify the vehicle asset pairing by:

determining, for each candidate vehicle asset pairing:

an asset distance difference based on the distance of the interpolated position of the candidate vehicle asset from the selected reported position of the selected vehicle asset; and an asset speed difference based on a difference between the interpolated vehicle asset speed of the candidate vehicle asset and the selected vehicle asset speed of the selected vehicle asset; and identifying the vehicle asset pairing based on the asset distance difference and the asset speed difference of each of the one or more candidate vehicle asset pairings.

10. The system of claim 1, wherein the telematics data further comprises map data, and the at least one processor is further operable to identify the vehicle asset pairing by:

identifying a first road segment having the selected reported position of the selected vehicle asset thereon;

identifying, for each of the one or more candidate vehicle asset pairings, a second road segment having the interpolated position of the candidate vehicle asset thereon; and identifying the vehicle asset pairing based on whether the first road segment and the second road segment are a same type of road segment.

11. The system of claim 1, wherein the at least one processor is further operable to determine a location, a time, or a combination thereof corresponding to when the vehicle asset pairing occurred and/or terminated.

12. The system of claim 11, wherein the at least one processor is operable to determine the location, the time, or the combination thereof corresponding to when the vehicle asset pairing occurred and/or terminated by propagating geospatial data associated with the vehicle asset pairing backwards or forwards temporally until the vehicle asset pairing is at rest;

based on a speed difference between the vehicle assets of the vehicle asset pairing exceeds a predetermined threshold; based on the selected vehicle asset being paired with a different candidate vehicle asset; or a combination thereof.

13. A method for identifying a vehicle asset pairing, the method comprising operating at least one processor to:

receive telematics data, the telematics data comprising geospatial data associated with a plurality of vehicle assets;

identify, using the geospatial data, one or more positions of each of the plurality of vehicle assets reported within a selected timeframe;

define a search zone based on a selected reported position of a selected vehicle asset, the search zone defined using a hierarchical geospatial indexing system;

identify one or more candidate vehicle asset pairings, each candidate vehicle asset pairing being between the selected vehicle asset and a candidate vehicle asset having at least one reported position located within the search zone;

identify, if the candidate vehicle asset has two or more reported positions within the search zone, a first reported position and a second reported position of the candidate vehicle asset;

generate an interpolated position of the candidate vehicle asset based on the first reported position and the second reported position thereof that is most proximate the selected reported position of the selected vehicle asset for each candidate vehicle asset pairing; and identify the vehicle asset pairing based at least in part on a distance of the interpolated position of the candidate vehicle asset from the selected reported position of the selected vehicle asset of each candidate vehicle asset pairing.

14. The method of claim 13, wherein the defining of the search zone comprises operating the at least one processor to:

identify, based on the hierarchical geospatial indexing system, a first cell corresponding to a geographical area within which the selected reported position of the selected vehicle asset is located;

determine a plurality of neighboring cells based on the first cell; and define the search zone based on a geographical area corresponding to the first cell and the neighboring cells.

15. The method of claim 14, wherein the hierarchical geospatial indexing system is a geohash system.

16. The method of claim 13, further comprising operating the at least one processor to identify the one or more candidate vehicle asset pairings based at least in part on a difference between a reporting time of the selected reported position of the selected vehicle asset and a reporting time of each of the at least one reported positions of the candidate vehicle asset, a difference in speed between the selected vehicle asset at the selected reported position and the candidate vehicle asset at each of the at least one reported positions of the candidate vehicle asset, or a combination thereof.

17. The method of claim 13, wherein, if one of the first reported position and the second reported position of the candidate vehicle asset occur prior to the selected reported position of the selected vehicle asset, and the other of the first reported position and the second reported position of the candidate vehicle asset occur after to the selected reported position of the selected vehicle asset, the generating of the interpolated position comprises operating the at least one processor to generate the interpolated position between the first reported position and the second reported position of the candidate vehicle asset for each candidate vehicle asset pairing.

18. The method of claim 17, wherein the generating of the interpolated position comprises operating the at least one processor to generate the interpolated position along a line extending between the first reported position and the second reported position of the candidate vehicle asset for each candidate vehicle asset pairing.

19. The method of claim 13, wherein, if the candidate vehicle asset has only one reported position located within the search zone, the generating of the interpolated position comprises operating the at least one processor to generate the interpolated position thereof based on that reported position.

20. The method of claim 13, wherein, if both of the first reported position and the second reported position of the candidate vehicle asset occur prior to, or after, the selected reported position of the selected vehicle asset, the generating of the interpolated position comprises operating the at least one processor to generate the interpolated position thereof based on a most proximate of the first reported position and the second reported position relative to the selected reported position.

21. The method of claim 13, wherein:

the selected vehicle asset at the selected reported position has associated therewith a selected vehicle asset speed, each candidate vehicle asset at the first reported position has associated therewith a first vehicle asset speed, each candidate vehicle asset at the second reported position has associated therewith a second vehicle asset speed, each candidate vehicle asset at the interpolated position thereof has associated therewith an interpolated vehicle asset speed based at least in part on the first vehicle asset speed and the second vehicle asset speed of the candidate vehicle asset; and the identifying of the vehicle asset pairing comprises operating the at least one processor to:

determine, for each candidate vehicle asset pairing:

an asset distance difference based on the distance of the interpolated position of the candidate vehicle asset from the selected reported position of the selected vehicle asset; and an asset speed difference based on a difference between the interpolated vehicle asset speed of the candidate vehicle asset and the selected vehicle asset speed of the selected vehicle asset; and identify the vehicle asset pairing based on the asset distance difference and the asset speed difference of each of the one or more candidate vehicle asset pairings.

22. The method of claim 13, wherein the telematics data further comprises map data, and the identifying of the vehicle asset pairing further comprises operating the at least one processor to:

identify a first road segment having the selected reported position of the selected vehicle asset thereon;

identify, for each of the one or more candidate vehicle asset pairings, a second road segment having the interpolated position of the candidate vehicle asset thereon; and identify the vehicle asset pairing based on whether the first road segment and the second road segment are a same type of road segment.

23. The method of claim 13, further comprising operating the at least one processor to determine a location, a time, or a combination thereof corresponding to when the vehicle asset pairing occurred and/or terminated.

24. The method of claim 21, wherein the determining of the location, the time, or the combination thereof corresponding to when the vehicle asset pairing occurred and/or terminated comprises operating the at least one processor to:

propagate geospatial data associated with the vehicle asset pairing backwards or forwards temporally until the vehicle asset pairing is at rest;

determine whether a speed difference between the vehicle assets of the vehicle asset pairing exceeds a predetermined threshold; determine whether the selected vehicle asset is paired with a different candidate vehicle asset; or a combination thereof.

25. A non-transitory computer readable medium having instructions stored thereon executable by at least one processor to implement a method for identifying a vehicle asset pairing, the method comprising operating at least one processor to:

receive telematics data, the telematics data comprising geospatial data associated with a plurality of vehicle assets;

identify, using the geospatial data, one or more positions of each of the plurality of vehicle assets reported within a selected timeframe;

define a search zone based on a selected reported position of a selected vehicle asset, the search zone defined using a hierarchical geospatial indexing system;

identify one or more candidate vehicle asset pairings, each candidate vehicle asset pairing being between the selected vehicle asset and a candidate vehicle asset having at least one reported position located within the search zone;

identify, if the candidate vehicle asset has two or more reported positions within the search zone, a first reported position and a second reported position of the candidate vehicle asset;

generate an interpolated position of the candidate vehicle asset based on the first reported position and the second reported position thereof that is most proximate the selected reported position of the selected vehicle asset for each candidate vehicle asset pairing; and identify the vehicle asset pairing based at least in part on a distance of the interpolated position of the candidate vehicle asset from the selected reported position of the selected vehicle asset of each candidate vehicle asset pairing.

* * * * *